(12) United States Patent
Siedler

(10) Patent No.: US 6,324,740 B1
(45) Date of Patent: Dec. 4, 2001

(54) UNIVERSAL JOINT DISASSEMBLY TOOL

(76) Inventor: Richard E. Siedler, 447 S. Olive St., Apt. #8, Mesa, AZ (US) 85204

( * ) Notice: Subject to any disclaimer, the term of this patent is extended or adjusted under 35 U.S.C. 154(b) by 0 days.

(21) Appl. No.: 09/474,961

(22) Filed: Dec. 30, 1999

(51) Int. Cl.⁷ .................................................. B23P 19/04
(52) U.S. Cl. ........................... 29/254; 29/251; 29/263; 29/255; 29/257
(58) Field of Search ..................... 29/254, 255, 283, 29/282, 263, 559, 434, 244, 251, 257

(56) References Cited

U.S. PATENT DOCUMENTS

| | | | |
|---|---|---|---|
| 3,237,291 | * | 3/1966 | Kelso ........................................ 29/251 |
| 3,429,021 | * | 2/1969 | Spiess ...................................... 29/251 |
| 3,750,500 | * | 8/1973 | Peterson .................................. 29/255 |
| 3,786,544 | | 1/1974 | Ferguson ................................. 29/251 |
| 4,558,502 | * | 12/1985 | Gossmann et al. ..................... 29/251 |
| 4,805,281 | | 2/1989 | Stark et al. .............................. 29/252 |
| 4,977,660 | * | 12/1990 | Maynard ................................. 29/257 |
| 5,836,078 | * | 11/1998 | Aiken et al. ............................ 29/251 |
| 5,857,252 | * | 1/1999 | Jansen ..................................... 29/257 |
| 5,890,271 | * | 4/1999 | Bromley et al. ........................ 29/263 |

\* cited by examiner

*Primary Examiner*—Joseph J. Hail, III
*Assistant Examiner*—Lee Wilson
(74) *Attorney, Agent, or Firm*—Richard R. Mybeck

(57) ABSTRACT

A simple, compact and lightweight tool for the disassembly of the universal joints used in automobiles, trucks, recreational vehicles, buses, boats, farm machinery, and other machinery. The tool directs pressure specifically to the point where it is needed to remove a bearing cup of the universal joint and will not bend or otherwise damage the universal joint or driveline. The tool can be easily stored in a mechanic's toolbox.

3 Claims, 4 Drawing Sheets

FIGURE #1

Figure 1:
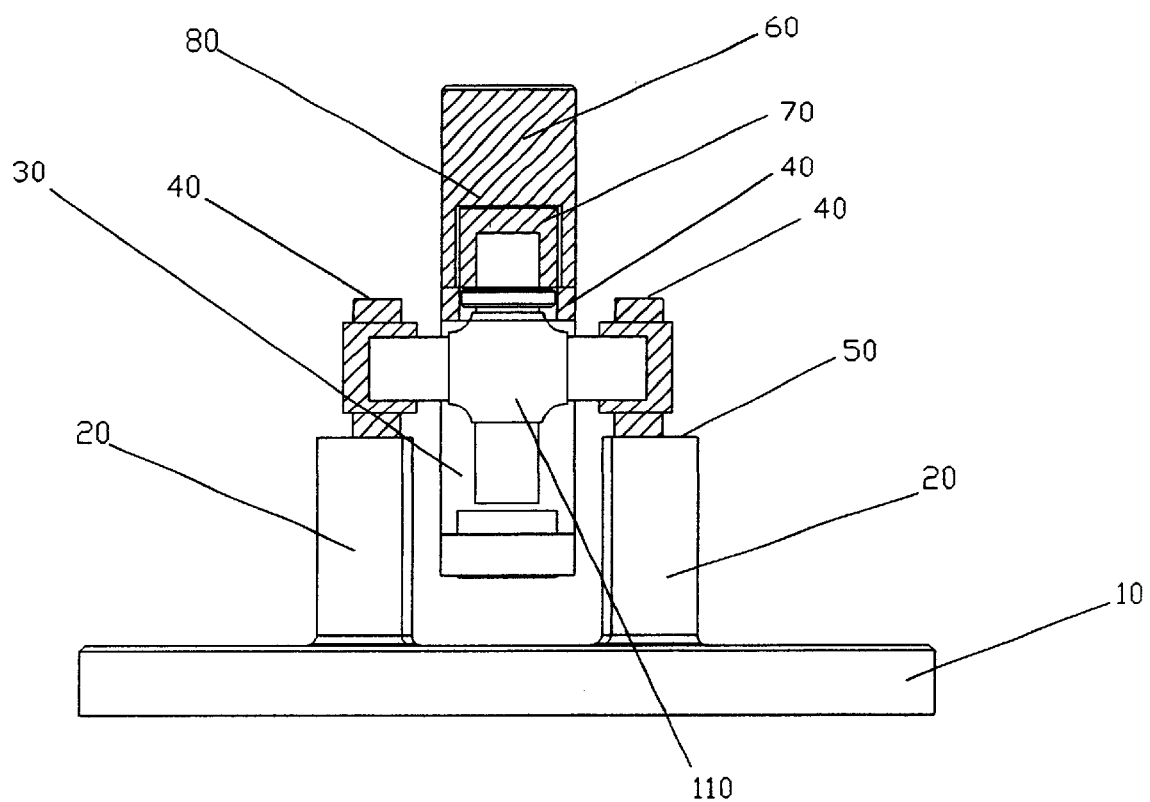

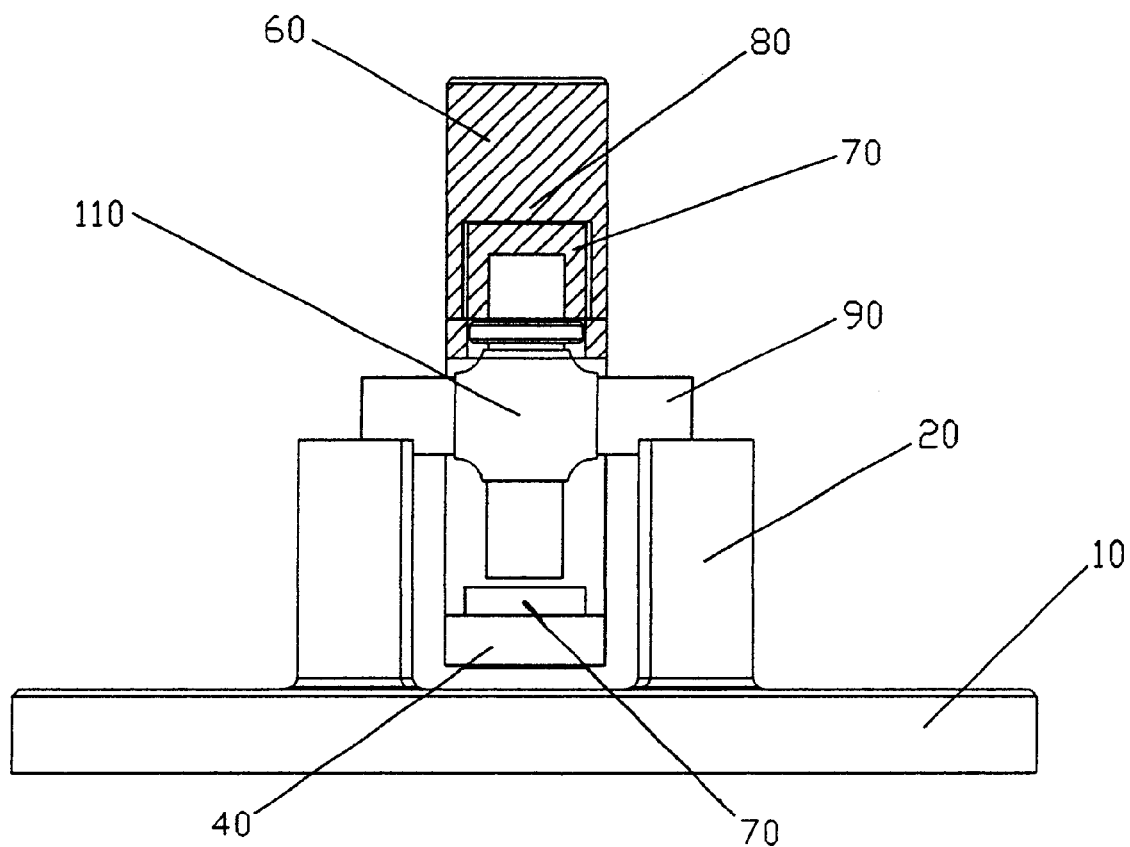
FIGURE # 3

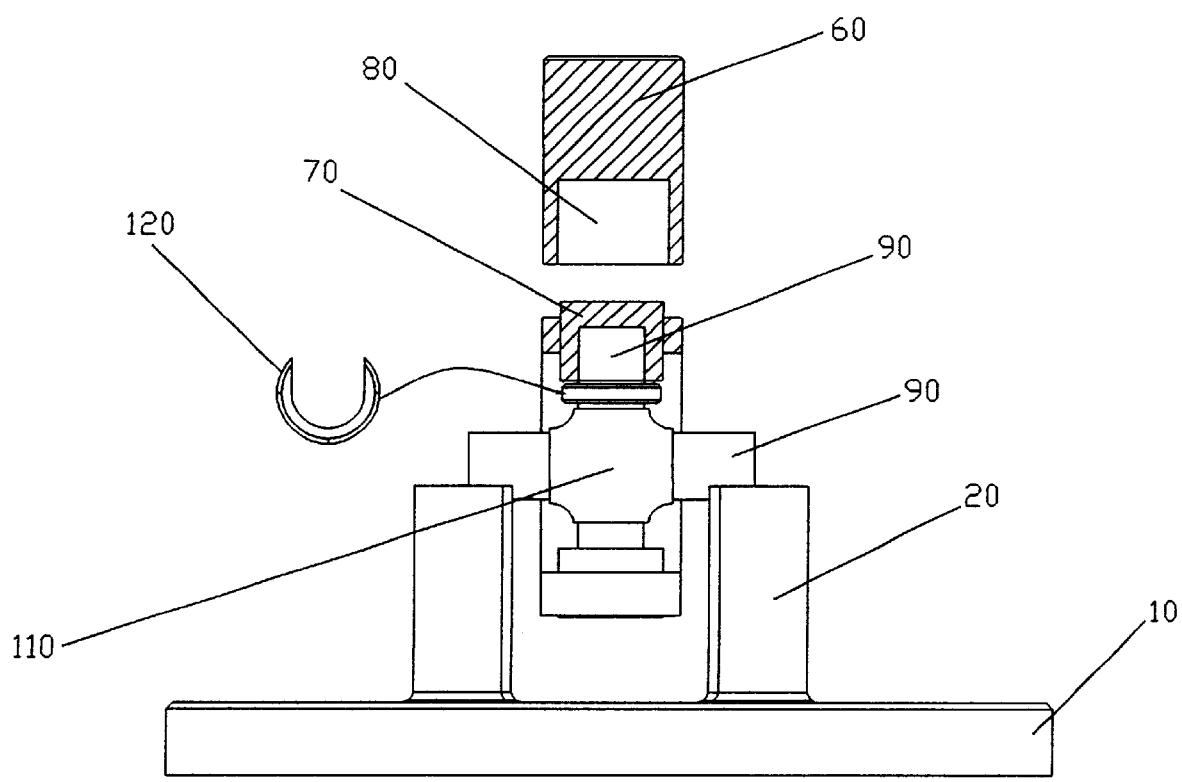
FIGURE #4

UNIVERSAL JOINT DISASSEMBLY TOOL

BACKGROUND OF THE INVENTION

1. Field of the Invention

The present invention relates generally to the field of mechanics tools and equipment for the repair of automobiles and other motorized vehicles and more specifically to the field of devices for the disassembly of the universal joints used in the drive train of automobiles, trucks, recreational vehicles, buses, farm machinery and other machinery.

2. Description of the Prior Art

The field of devices which are used to assemble and disassemble universal joints has been studied extensively and a number of approaches have been developed. This field is important because such a device can save a mechanic a considerable amount of time during repairs to the drive train of a vehicle and avoid any damage to the universal joint during the process of assembly and disassembly. Most of the devices which are presently available to the mechanic are complex and bulky units, making them unsuitable as a tool to be carried in a mechanic's toolbox or included as a standard tool for a small garage or automotive machine shop. A review of tools and equipment for assembly and disassembly of universal joints has not revealed a simple device which incorporates features to address these problems.

One example of a device to remove and install the bearing caps of a universal joint is disclosed in U.S. Pat. No. 3,786,544, issued to Ferguson. This device consists of a sturdy rigid frame which completely encircles the universal joint during the assembly or disassembly process. The device uses a threaded rod passing through the frame to apply pressure to the bearing cups during disassembly. The end of the threaded rod opposite the universal joint is struck with a hammer to initiate a vibration in the frame much like the arms of a tuning fork to break loose a stuck bearing cap. A second press with a threaded rod located at 90 degrees to the first press is used to apply the pressure for pressing the cups back into the yoke of the universal joint. The device applies a great amount of pressure which tends to force the outer ends of the yoke toward one another, thereby creating the possibility of damaging the universal joint by permanently bending the yoke. Further, the device is very bulky and heavy. For this reason, the device is most appropriately used when bolted to the surface of a worktable.

Another example is disclosed in U.S. Pat. No. 4,805,281, issued to Stark, et al. and since abandoned. The device is a hydraulically operated apparatus for assembling universal joints. The unique features disclosed by the invention concern refinements to the hydraulic control system to insert the bearing cups of a universal joint to an accurately controlled depth in the yoke. The device is suitable only for a production environment and is much too complex and expensive for the toolbox of a mechanic or small repair facility.

U.S. Pat. No. 4,977,660, issued to Maynard, which has since been abandoned, discloses a device for supporting and positioning a universal joint for removal and installation of the bearing cups. The frame of the device consists of a base with a rigidly attached vertical member and a horizontal member attached rigidly to and extending perpendicular to said vertical member and parallel to the base. A vertical rod which slides up and down through a cavity in the horizontal member is used to apply pressure to the bearing cups of the universal joint using pressure cups of appropriate dimension in relation to the bearing cups. The frame of the device is similar to a yoke surrounding the universal joint and is bulky and heavy. Pressure for assembly and disassembly is applied through blows to the end of the vertical rod with a hammer. A pair of anvils positioned on the base of the device supports the cross of the universal joint. The pair of anvils is movable to fit universal joints of different sizes. The device is not suitable for the toolbox of most mechanics because of its size and weight. Further, it has a number of movable/removable parts which must be positioned for the removal or installation of each bearing cup of the universal joint. In addition to increasing the time required for assembly and disassembly, the use of multiple movable and removable parts increases the likelihood of a loss of key parts to the device in the normal environment of a repair facility. The pair of anvils has a flat surface on top and does not provide a cradle for the cross trunnion of a universal joint. The physical shape and size of the anvils prevents its use on the double constant velocity type of universal joint assembly. Further, for approximately 25% of the universal joints in use today, this invention will not allow the bearing cup to be pressed completely free of the yoke.

A method for installing and removing the bearing cups of a universal joint is disclosed in U.S. Pat. No. 5,836,078, issued to Aiken. The method specifically discloses a ram which may be either hydraulically or mechanically operated. Although the method used to provide the force of the ram is not claimed specifically, the invention is complex and will be heavy and bulky regardless of the specifics of the ram design for this invention. The device applies pressure to the top and bottom bearing cups simultaneously. The pressure forces the bottom bearing cup outward while the top bearing cup is forced deeper into the yoke span, requiring a separate operation to press the top bearing back to its original position then outward from the yoke. The invention appears to be geared more for a production environment and for one specific type of universal joint.

Finally, a press for inserting the bearing cups into a universal joint is found in U.S. Pat. No. 5,857,252, issued to Jansen.

The device consists of an arch or "C-shaped" member properly dimensioned to extend around the yoke of the universal joint with opposing anvil and plunger mechanism removably attached. Sufficient pressure is applied to the plunger to force the bearing cup into the universal joint.

Thus, a variety of devices to remove and install the bearing cups of a universal joint are known. Most of the devices are far too bulky and heavy to be stored in a mechanic's toolbox. The one 10 device which could be contained in a tool box disclosed in U.S. Pat. No. 5,857,252 and as previously discussed is used only for the insertion of the bearing cups for assembly of a universal joint and not for disassembly. In most cases, a mechanic can assemble a universal joint by carefully lining up the bearing cups and installing them in the yoke of the universal joint using ordinary mechanics tools. In fact, it is common practice in automotive machine and repair shops to install the bearing cups of a universal joint by simply tapping the bearing cups in place with a hammer. The problems arise when the mechanic attempts to remove the bearing cups of a universal joint that has not been disassembled for several years and has been exposed to the weather. In many cases, it is almost impossible to disassemble the universal joint without damaging the bearing cups or the yoke or both when ordinary mechanics tools are used.

Accordingly, it would be desirable to develop a simple tool which is compact and easy to store to aid a mechanic in removing the bearing cups on a universal joint. Such a device should be designed to fit a majority of the universal joints presently in use on automobiles and light trucks without adjustment.

SUMMARY OF THE INVENTION

In view of the foregoing disadvantages inherent in the known types of tool for the disassembly of universal joints, the present invention makes available a tool which consists of a basic one-piece base and anvil assembly which holds the universal joint in position for removal of the bearing cups of a majority of the universal joints used in automobiles, trucks, recreational vehicles, buses, boats, farm machinery, and other machinery without adjustment. It is compact and lightweight and can be easily stored in a mechanic's toolbox. The tool directs pressure specifically to the point where it is needed to remove a bearing cup of the universal joint and will not bend or otherwise damage the universal joint or driveline. The complete invention consists of the following parts; a rigid base, two upright anvils rigidly attached to the base to support the two ends of the yoke of the universal joint, semicircular grooves or depressions in the upper ends of the anvils of appropriate design and diameter to support and register either ends of the yoke of the universal joint or the trunnions of the cross of the universal joint once the first two bearing cups have been removed, a ram with a cavity of appropriate dimension to allow a bearing cap to fit inside while the surface of the ram is used to apply pressure to the yoke of the universal joint, a knurled gripping surface on the ram to allow the mechanic to grip the ram without slipping, and a "C-shaped" means for shimming. The base serves as a rigid foundation for the two anvils. The two anvils are rigidly attached and perpendicular to the base. The shimming means is required for disassembly of certain types of universal joints.

The base and anvils are preferably made of a rigid material such as metal. The upper ends of the anvils in the region of the concave slots are preferably tempered to increase the hardness of the metal in these wear areas. The ram is cylindrical in shape and is made of a rigid material such as metal. The end of the ram which comes in contact with the yoke of the universal joint has a cavity of sufficient diameter and depth to allow the bearing cup to pass inside the cavity during the disassembly process. The ram is preferably heat treated to increase the hardness of the metal. The shimming means is "C" shaped and made of a rigid material such as metal. The base and anvils are preferably of the same type of material and joined together by welding.

When in use, the base is placed on a solid foundation such as a concrete floor. The ram is used in conjunction with the base and anvils. The universal joint first is positioned on top the anvils. The end of the ram having the cavity is placed over the top bearing cup of the universal joint. With the universal joint properly aligned on the anvils of invention, the upper end of the ram (the end opposite the end of the ram having a cavity) is struck with a large hammer. The force of the hammer striking the ram drives the bearing cup upward and free. In practice when more travel is needed to free the bearing cup from the yoke of the universal joint, the "C-shaped" shim is placed between the bearing cup and the cross of universal joint and the ram struck with a hammer a second time. Continuing the disassembly, the universal joint is rotated 180 degrees in a plane perpendicular to the plane of the base. The second bearing cup will now be on top in a position for removal. The same process as was used for removing the first bearing cup is now repeated to remove the second bearing cup. The universal joint is rotated 90 degrees in the same plane as before, bringing the third bearing cup to the top and the cross of the universal joint is placed in the semicircular grooves at the top of each anvil. The process used to remove the previous two bearing cups is repeated to remove the third bearing cup. The universal joint is then rotated 180 degrees in the same plane as before, bringing the fourth bearing cup to the top. The process used to remove the previous three bearing cups is repeated to remove the fourth bearing cup. Maneuvering the cross free of the universal joint by hand completes the universal joint disassembly.

BEST MODES FOR CARRYING OUT THE INVENTION

The preferred embodiment of the present invention can be best understood by reference to the drawings.

FIG. 1 is front cut-away view of the invention.

Referring to FIG. 1, the invention consists of a rigid base 10 to which a pair of upright anvils 20 are rigidly attached. One of the upright anvils 20 is fixedly attached to the rigid base 10. The other anvil 20 is either fixedly attached to rigid base 10 or moveably attached to rigid base 10 to allow for adjustment in the spacing between the pair of upright anvils 20 to accommodate universal joints of varying sizes. In FIG. 1, the pair of upright anvils 20 is fixedly attached to rigid base 10 by welding.

Figure 2:
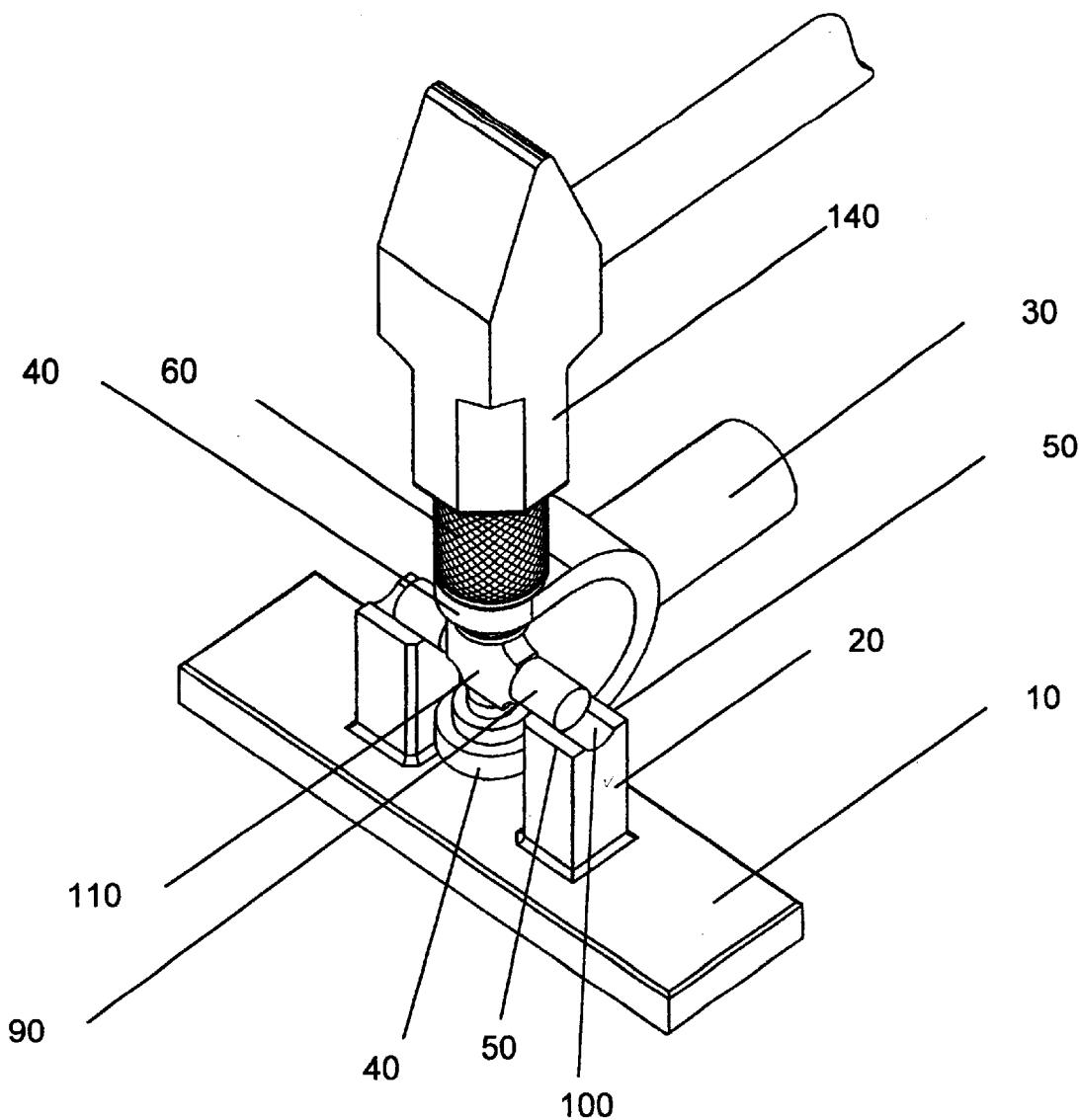

In the first step of disassembly, universal joint 30 is positioned on the invention so that the ends 40 of the yoke of the universal joint 30 rest on the top surfaces 50 of the upright anvils 20. Ram 60 is placed in contact with the end 40 of the yoke of the universal joint 30 surrounding the bearing cup 70 which is positioned at the top. Force is applied to the end 40 of the yoke of universal joint 30 by striking ram 60 with a hammer 140. The relationship of hammer 140 to ram 60 is best seen in FIG. 2, an isometric view of the invention. Ram 60 is struck with hammer 140 repetitively with sufficient force to drive bearing cup 70 up out of end 40 of the yoke of universal joint 30 and into the cavity 80 in ram 60. Universal joint 30 is rotated 180 degrees in a plane perpendicular to rigid base 10 such that the bearing up 70 opposite to the bearing cup 70 which was removed is now on the top. The removal procedure is repeated. FIG. 2 and FIG. 3 show the position of the universal joint 30 positioned on the invention after the first two bearing cups 70 have been removed and the universal joint 30 has been rotated 90 degrees in a plane perpendicular to rigid base 10. The trunnions 90 of the cross of universal joint 30 are positioned in the depressions 100 of upright anvils 20. Likewise, the ram 60 and hammer 140 are used to remove the third and fourth bearing cups 70.

In some cases the configuration of universal joint 30 is such that the end 40 of the yoke of universal joint 30 strikes the cross 110 of universal joint 30 prior to the point at which bearing cup 70 has been moved outside the end 40 of the yoke of universal joint 30. Referring to FIG. 4, a front cutaway view of the invention, shim 120 is inserted on trunnion 90 and ram 60 is again used to remove bearing cup 70 from the end 40 of universal joint 30.

The embodiment of the present invention as set forth herein may be specifically designed for the disassembly of a group of universal joints presently in use in a majority of the automobiles and small trucks. By providing for movement of the upright anvil or a change in the dimensions of the detail parts of the invention, or both, the invention can be easily designed to accommodate the larger universal joints used in the drive train of large trucks and heavy equipment.

Therefore, although only one embodiment of the present invention is set forth herein, it is apparent to someone skilled in the art that various changes and modifications of an obvious nature may be made without departing from the spirit of the invention, and all such changes and modifications are considered to fall within the scope of the invention as defined by the appended claims.

What is claimed is:

1. A tool for the disassembly of a universal joint of a drive train of a motor vehicle, the universal joint having a cross with four trunnions, four removable bearing cups and two yokes, and said tool comprising:

a base means; said base means comprising a rigid plate having a first plane parallel to a surface upon which said tool rests, a second plane parallel to and located immediately above said first plane, and said first plane and said second plane bounded by a surface or surfaces perpendicular to said first and said second planes;

shimming means in the shape of a horseshoe having an opening which fits over and around the trunnion and between the inside surface of the bearing cup and the cross of the universal joint to push the bearing cup a greater distance when a bearing cup is removed from certain universal joints.

2. The tool of claim 1 wherein surfaces of said vertical support means and said ram means in contact with the universal joint are heat-treated to increase hardness.

3. The tool of claim 1 wherein the cylindrical surface of said ram means is knurled to aid a mechanic in gripping the ram means without slipping.

* * * * *